UNITED STATES PATENT OFFICE.

GEORGE MITCHELL, OF WESTMINSTER, LONDON, ENGLAND.

PROCESS OF EXTRACTING GUTTA-PERCHA OR THE LIKE FROM LEAVES OR TWIGS CONTAINING IT.

SPECIFICATION forming part of Letters Patent No. 695,751, dated March 18, 1902.

Application filed July 10, 1901. Serial No. 67,776. (No specimens.)

*To all whom it may concern:*

Be it known that I, GEORGE MITCHELL, a citizen of England, residing at 39 Victoria street, Westminster, in the county of London, England, have invented a certain new and useful Process of Extracting Gutta-Percha or the Like from Leaves and Twigs Containing It, of which the following is a specification.

My invention relates to a process for extracting in a pure condition gutta-percha or the like substance from leaves or twigs containing it. For this purpose I dry the leaves or twigs and reduce them to a fine powder, which I intimately mix with carbon bisulfid, by which the gummy constituents of the powder are dissolved. By subsidence or centrifugal treatment I separate the solution from the insoluble matters and then filter the solution through charcoal. I then from the filtered solution separate the carbon bisulfid by distillation, condensing it so as to serve again as solvent. The material from which the solvent is distilled is pure gutta-percha when the leaves and twigs treated are those of the gutta-percha-producing plant or may be a similar gum when the leaves and twigs of similar plants are treated.

In conducting the process some of the operations may be more or less varied. For instance, the powder may be mixed with the solvent by agitators, or the powder may be distributed over the surface of a deep vessel containing the solvent in which the particles sink gradually while the gum is dissolved out of them. After some time given for subsidence the solution can be separated from the solid particles by decantation. For filtering the solution it is preferable to pass it slowly through a deep body of charcoal or through successive layers of charcoal. The solvent may be distilled off by heating the solution in a still heated by steam or hot water, or the solution may be poured on hot water contained in the still.

I am aware that carbon bisulfid has been employed for extracting gutta-percha and the like from leaves or twigs; also, that gutta-percha obtained in other ways has been purified by passing a solution of it through charcoal, and I therefore make no general claim for either of these operations applied to gutta-percha or like substances; but,

Having thus described the nature of this invention and the best means I know of carrying the same into practical effect, I claim—

The method of extracting gutta-percha or similar substance from foreign substances, such as leaves or twigs, consisting in mixing the same with carbon bisulfid, and dissolving the gutta-percha, separating the solution from the solid particles of foreign matter, filtering the solution, and then distilling the gutta-percha solution to obtain the gutta-percha; substantially as described.

In testimony whereof I have hereunto set my hand in presence of two subscribing witnesses.

GEORGE MITCHELL.

Witnesses:
   GEORGE MURTON,
   RICHARD PECK.